May 1, 1956     I. H. DRIGGS ET AL     2,743,886

VERTICAL CLIMBING AIRPLANE

Filed July 8, 1952

Inventors
IVAN H. DRIGGS
ABRAHAM HYATT
FRAMPTON E. ELLIS, JR.

By
*G. F. Schmitt*
*Walter S. Paul*
Attorneys

United States Patent Office 2,743,886
Patented May 1, 1956

2,743,886

VERTICAL CLIMBING AIRPLANE

Ivan H. Driggs, Montgomery County, Md., Abraham Hyatt, Washington, D. C., and Frampton E. Ellis, Jr., Montgomery County, Md.

Application July 8, 1952, Serial No. 297,796

5 Claims. (Cl. 244—7)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in heavier than air craft having superior take-off and landing characteristics and capable of hovering with a high degree of control reserved to the pilot.

An object of the invention is to provide an aircraft of the rigid propeller, that is, non-cyclic pitch, type which is capable of vertical landing, take-off and hovering, and yet can fly with ample aerodynamic control in the type of flight considered normal for a conventional airplane.

A related object of the invention is to provide a flight control system that is operable to cause displacement of the aircraft laterally while it is in the hovering condition and selectively, to control the aircraft in normal flight in the conventional way. This is accomplished by having fine engine thrust control and by having certain of the aerodynamic control surfaces in the slipstream of the propeller and others removed therefrom.

Other objects and features will become apparent in following the description of the illustrated embodiment of the invention.

Figure 1:
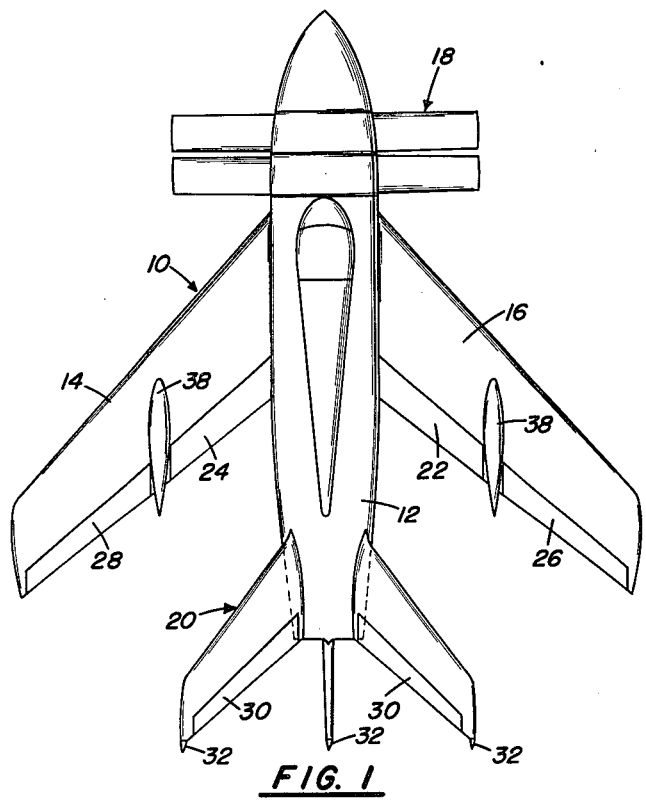
Fig. 1 is a plan view of an aircraft made in accordance with the teachings of the invention.

The quintessence of the invention is the means of controlling an aircraft while it is in hovering flight, and yet have ample control for conventional flight. Previous aircraft capable of hovering have either involved a multiplicity of lifting and control rotors, or as in the more recent successful autogyros and helicopters, cyclic control of the pitch of the rotor blades is used to give the desired displacing forces to move the aircraft in the desired direction. A less successful method was that of tilting the whole rotor relative to the fuselage of the machine. Practically all such designs have involved large rotors with the blades flexibly mounted to relieve the gyroscopic and aerodynamic loads. One type of aircraft designed for vertical flight is shown in the Patent No. 2,387,762 granted to L. H. Leonard on October 30, 1945. However, the patented device relies upon large diameter propellers extending out beyond the tips of the wings and of such size that the propellers alone in the absence of engine power will retard descent in the manner of existing helicopters or autogyros. The present aircraft differs in essence from these prior aircraft. Here a small rigid propeller is used to provide the lifting force for vertical flight, the propeller being preferably of the dual counter-rotating type to eliminate torque, and having conventional automatic pitch adjusting means. If the propeller size, aircraft weight, and engine power are properly coordinated, a power system can be arrived at giving adequate thrust for take off, reasonably good propeller efficiency in flight as a normal airplane, and most important, adequate slipstream velocity over the control surfaces to make satisfactory control in the hovering condition possible.

The configuration of aircraft 10 is quite similar to a conventional airplane, including a streamline body or fuselage 12 to which the wing half-spans 14 and 16 are fixed. A dual counter-rotating propeller 18 actuated by a suitable engine, is disposed at the front of the fuselage 12, and an empennage or tail section 20 is located at the aft end of the fuselage. The propeller is rotatable about an axis substantially coincident with the longitudinal axis of the fuselage. Inboard, hovering ailerons 22 and 24 are provided in the propeller slipstream at the trailing edge of the wing and outboard, cruising ailerons 26 and 28 are mounted on the outboard portions of the wing in such location as to be spaced laterally from the propeller slipstream. The actual means for operating the ailerons are conventional in nature, but it is to be noted that two different systems can be used. The cruising ailerons 26 and 28 may be arranged to be actuated simultaneously with the hovering ailerons 22 and 24, or each group may be arranged to operate independently. Aerodynamic control elements having surfaces 30 are provided as a part of the empennage 20, and these control elements are located in the propeller slipstream. Supports 32 are connected with the empennage, and their primary function is to maintain the airplane with its thrust line T substantially vertical for take off purposes.

Figure 2:
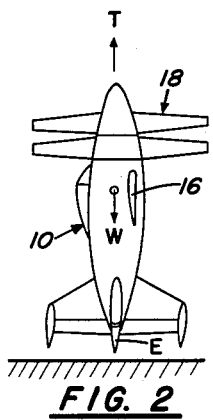
Fig. 2 is a schematic view of the aircraft in a hovering condition of operation.
Figure 3:
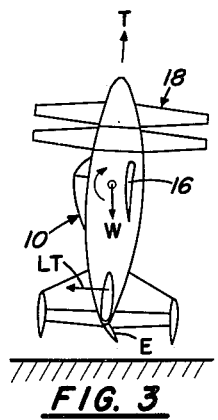
Fig. 3 is a schematic view of the aircraft pitching from the position of Fig. 2 and beginning to gain speed.
Figure 4:
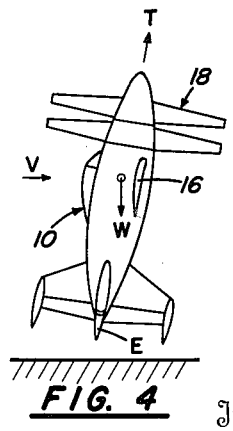
Fig. 4 is a schematic view of the aircraft showing lateral displacement thereof with a constant pitch angle and trim elevator deflection.

The operation of the aircraft in straight and level flight or in any normal maneuver is the same as almost any standard airplane. However, even though the airplane performs like a conventional heavier than air craft in normal flight, the airplane 10 is capable of hovering, as a helicopter or autogyro, at which time the airplane is sustained by propeller thrust rather than wing lift. Figs. 2–4 are schematic views showing the principle of the type of hovering flight control employed. In Fig. 2 the aircraft is hovering in one place with the thrust axis T vertical and the lift so produced, is equal to the aircraft total weight W. Now assume that the pilot desires to move the aircraft to the right. He moves the control stick forward so as to depress the elevators E thereby generating a lift force LT on the control surface as a consequence of the high slip-stream velocity. Thus, the whole aircraft is pitched over into the desired direction of motion V and the lateral component of thrust T accelerates the aircraft in this direction. When the desired speed of translation is reached, the pitch angle is adjusted by means of the elevator control so that the lateral component of thrust balances the drag of the aircraft. The motion would be stopped by moving the control in the opposite direction to pitch the aircraft opposite to the direction of motion. During these maneuvers, the pilot maintains constant altitude by varying the power slightly with the throttle to compensate for the changes in thrust due to the variations in pitch angle and velocity, the propeller revolutions being governed at the desired value by conventional means.

Special attention is drawn to the fact that the aerodynamic surfaces 22, 24 and 30 for hovering control are in the downwash of the propeller, this being necessary to provide directional control while the aircraft is in hovering flight and the forward speed of the aircraft is zero or approximately zero. In addition, the cruising ailerons 26 and 28 are laterally removed from the propeller slipstream so that in normal flight, they are unaffected by the propeller slipstream. In use, such refinements as a pivotally mounted seat for the pilot are intended. For military use, suitable armament, as guns in fairings 38, together with foldable wings will be used.

Even though the empennage 20 differs in construction from that shown in Figs. 2-4, either may be used, and the same is true of various other accepted empennage arrangements. Moreover, other modifications may be made without departing from the scope of the following claims.

What is claimed is:

1. A heavier than air craft comprising a streamline body, a dual unit, single axis, a counter rotating propeller at the forward end of said body, an empennage at the rear end of said body and having aerodynamic surfaces in the slipstream of said propeller, a wing projecting laterally of said body at a point between said propeller and said empennage, said propeller being rotatable about an axis substantially coincident with the longitudinal axis of said streamline body, said axes being substantially vertical during vertical flight and substantially horizontal during horizontal flight, cruising ailerons mounted on the outer end portions of said wing and spaced laterally from the propeller slipstream and means to operate said cruising ailerons, hovering ailerons mounted on the inboard portion of said wing and in the propeller slipstream to control the craft while hovering and while in vertical flight, and means operable independently of said cruising aileron operating means for actuating said hovering ailerons.

2. The aircraft of claim 1 and said empennage and hovering ailerons having a span substantially equal to the propeller diameter.

3. An aircraft capable of both vertical and horizontal flight, said aircraft comprising an elongated body having laterally projecting wings, a counter-rotating propeller at one end of the body mounted for rotation substantially about the longitudinal axis of said body for lifting the aircraft in vertical flight, the propeller projecting beyond the body to produce a slip-stream over a portion of each wing, to independent and independently operable sets of control means on said wings, one set being adjacent the body for response to the airflow of the slipstream, the other set being operable independently of the first set and remote from the body for response to the airflow outside the propeller slipstream.

4. An aircraft capable of both vertical and horizontal flight, said aircraft comprising an elongated fuselage, wings projecting outwardly from the fuselage, a propeller mounted at one end of the fuselage for rotation substantially about the longitudinal axis of the fuselage for maintaining the aircraft in a hovering position of flight, the propeller projecting beyond the fuselage to produce a slipstream over a portion of each wing, two independent sets of control surfaces on said wings, one set being responsive only to air flowing through the propeller and the other being operable independently of the first set and responsive only to air not flowing through the propeller.

5. An aircraft as set forth in claim 4, comprising a tail section at the end of the fuselage opposite the propeller, said tail section including control surfaces extending outwardly from the fuselage, the distance between the outer extremities of the tail section control surfaces being substantially equal to the diameter of the propeller.

References Cited in the file of this patent

UNITED STATES PATENTS

| | | |
|---|---|---|
| 2,191,839 | Zap | Feb. 27, 1940 |
| 2,308,802 | Barling | Jan. 19, 1943 |
| 2,365,382 | Bolkow | Dec. 19, 1944 |
| 2,450,709 | Beman | Oct. 5, 1948 |
| 2,494,368 | Steele | Jan. 10, 1950 |
| 2,580,841 | Ross | Jan. 1, 1952 |
| 2,622,826 | Prince | Dec. 23, 1952 |

FOREIGN PATENTS

| | | |
|---|---|---|
| 629,460 | Great Britain | Sept. 20, 1949 |